US009526951B1

(12) United States Patent
Ganson (10) Patent No.: US 9,526,951 B1
(45) Date of Patent: *Dec. 27, 2016

(54) SPORTS BALL SYSTEM FOR MONITORING BALL AND BODY CHARACTERISTICS AND METHOD THEREFOR (71) Applicant: Michael Ganson, Las Vegas, NV (US)

(72) Inventor: Michael Ganson, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 15/003,423

(22) Filed: Jan. 21, 2016

Related U.S. Application Data (63) Continuation-in-part of application No. 14/869,725, filed on Sep. 29, 2015.

(51) Int. Cl.
*A63B 43/00* (2006.01)
*A63B 37/02* (2006.01)
*A63B 24/00* (2006.01)

(52) U.S. Cl.
CPC ......... *A63B 43/004* (2013.01); *A63B 24/0062* (2013.01); *A63B 37/02* (2013.01); *A63B 2230/06* (2013.01); *A63B 2230/40* (2013.01)

(58) Field of Classification Search
CPC .............. A63B 24/002; A63B 2024/0053; A63B 2024/0028; A63B 43/00; A63B 43/004; A63B 43/04; A63B 43/06; A63B 2225/50; A63B 24/0062
USPC .......................................... 473/570
See application file for complete search history.

(56) References Cited

U.S. PATENT DOCUMENTS

| 4,775,948 | A | * | 10/1988 | Dial | A63B 69/0002 368/250 |
|---|---|---|---|---|---|
| 5,251,903 | A | * | 10/1993 | Bixler | A63B 43/00 473/140 |
| 5,761,096 | A | * | 6/1998 | Zakutin | A63B 43/00 368/2 |
| 7,578,603 | B2 | * | 8/2009 | Huang | A63B 37/0003 362/276 |
| 7,779,686 | B1 | * | 8/2010 | Rothman | A63B 43/00 473/192 |
| 2005/0261083 | A1 | * | 11/2005 | Liao | A63B 24/0021 473/353 |
| 2006/0105857 | A1 | * | 5/2006 | Stark | A63B 24/0021 473/353 |
| 2008/0188331 | A1 | * | 8/2008 | Shimizu | A63B 26/003 473/451 |
| 2009/0048044 | A1 | * | 2/2009 | Oleson | A63B 24/0062 473/570 |
| 2011/0118062 | A1 | * | 5/2011 | Krysiak | A63B 41/02 473/570 |
| 2012/0244969 | A1 | * | 9/2012 | Binder | A63H 33/18 473/570 |
| 2012/0255999 | A1 | * | 10/2012 | Luciano, Jr. | A63B 37/0003 235/439 |

(Continued)

*Primary Examiner* — Steven Wong
(74) *Attorney, Agent, or Firm* — Weiss & Moy, P.C.; Jeffrey D. Moy (57) ABSTRACT

A sports ball system for calculating movement characteristics uses a sports ball having components for monitoring and calculating the movement characteristics of the sports ball. The components are mounted on a spherical circuit board within the sports ball so the sports ball is balanced. A plurality of wearable sensors is provided monitoring body characteristics of an individual throwing the sports ball.

18 Claims, 7 Drawing Sheets

(56) References Cited

U.S. PATENT DOCUMENTS

| | | | |
|---|---|---|---|
| 2013/0073247 A1* | 3/2013 | Perkins | G01C 21/16 702/141 |
| 2013/0073248 A1* | 3/2013 | Perkins | A61B 5/6895 702/141 |
| 2013/0274040 A1* | 10/2013 | Coza | G09B 19/0038 473/570 |
| 2014/0045630 A1* | 2/2014 | Perkins | A63B 69/00 473/570 |
| 2014/0194233 A1* | 7/2014 | Saegusa | A63B 37/00 473/570 |
| 2014/0256478 A1* | 9/2014 | Gale | A63B 43/004 473/465 |

* cited by examiner

SPORTS BALL SYSTEM FOR MONITORING BALL AND BODY CHARACTERISTICS AND METHOD THEREFOR

RELATED APPLICATIONS

The present application is a Continuation-In-Part (CIP) application of U.S. patent application entitled, "SPORTS BALL THAT MEASURES SPEED, SPIN, CURVE, MOVEMENT AND OTHER CHARACTERISTICS AND METHOD THEREFOR", filed Sep. 29, 2015, having Ser. No. 14/869,725 and filed in the name of the same inventor as the present application.

TECHNICAL FIELD

The present application generally relates to a sports ball, and more specifically to a balanced baseball that has the characteristic of a regulation baseball and measures other movement characteristics as deemed relevant to include the speed, spin rate, curve of the baseball.

BACKGROUND

In many sports it is desired to determine how fast a ball is being either thrown or hit. Typically, the speed of a moving ball is measured using a Doppler radar system. Doppler radar systems determine a moving ball's speed by analyzing radar beams reflected off the ball. Although accurate, these systems are expensive and normally cannot be operated by the athlete whose toss or hit is being measured. For these reasons, systems of this type are generally restricted to organized sport teams.

Just as important to speed is to know the motion characteristics of the ball, such as the distance, time of flight, speed, height, spin rate, curve, release point or other motion characteristics of the thrown or batted ball. All of the above characteristics may be used to help a pitcher optimize different types of pitches. For example, spin rate information is useful for example in optimizing a baseball pitcher's curve ball pitching ability. Unfortunately, the above motion characteristics are difficult to measure. In general, the above motion characteristics are generally calculated by videotaping a pitch and having a complex computer program analyze the different motion characteristics. Thus, as with speed, systems of this type are generally restricted to organized sport teams.

Thus, the ability to measure and review different motion characteristics of a pitched ball is generally reserved for professional sporting teams. The typical amateur ball player is unable to measure, review and analyze the different motion characteristics of a pitched ball.

Presently, there are sports balls which allow one to track the speed and other characteristics of the thrown and/or hit ball. However, these balls are not regulation caliber. Thus, the correlation between readings from these sports balls and throwing a regulation sports ball may not be accurate. Further, many of these sports ball are not balanced. Throwing an unbalanced sports ball creates false motion characteristics and could result in throwing injuries.

Therefore, it would be desirable to provide a system and method that overcomes the above.

SUMMARY

In accordance with one embodiment, a sports ball system for calculating movement characteristics is disclosed. The sports ball system uses a sports ball having components for monitoring and calculating the movement characteristics of the sports ball. The components are mounted on a spherical circuit board within the sports ball so the sports ball is balanced. A plurality of wearable sensors is provided monitoring body characteristics of an individual throwing the sports ball.

In accordance with one embodiment, a sports ball system for calculating movement characteristics is disclosed. The sports ball system has a sports ball. The sports ball has a spherical core. A spherical circuit board is mounted within the spherical core and has components for monitoring and calculating movement characteristics of the sports ball. A mounting unit is formed within the spherical core for securing the spherical circuit board within the spherical core. The mounting unit has a platform housed within the spherical core. A plurality of mounting brackets is positioned around a perimeter of the platform. The mounting brackets are used to hold the spherical circuit board in place and deflect kinematic energy. Winding is wrapped around the spherical core. A cover is positioned around the winding. A plurality of wearable sensors is provided for monitoring body characteristics of an individual throwing the sports ball. The plurality of wearable sensors comprises at least one wrist sensor, at least one foot sensor and a chest sensor.

In accordance with one embodiment, a sports ball system for calculating movement characteristics is disclosed. The sports ball system has a sports ball. The sports ball has a spherical core. A spherical circuit board is mounted within the spherical core and has components for monitoring and calculating movement characteristics of the sports ball. A mounting unit is formed within the spherical core for securing the spherical circuit board within the spherical core. The mounting unit has a platform housed within the spherical core. A plurality of mounting brackets is positioned around a perimeter of the platform. The mounting brackets are used to hold the spherical circuit board in place and deflect kinematic energy. Winding is wrapped around the spherical core. A cover is positioned around the winding. A plurality of wearable sensors is provided for monitoring body characteristics of an individual throwing the sports ball. The plurality of wearable sensors comprises at least one wrist sensor, at least one foot sensor and a chest sensor, wherein the at least one wrist sensor monitors arm movement and muscle movement, the at least one foot sensor monitors foot movement and the at least one of chest sensor monitors at least one of chest movement, breathing patterns and heart rate.

BRIEF DESCRIPTION OF THE DRAWINGS

The present application is further detailed with respect to the following drawings. These figures are not intended to limit the scope of the present application but rather illustrate certain attributes thereof. The same reference numbers will be used throughout the drawings to refer to the same or like parts.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Embodiments of the exemplary system and method disclose a regulation sports ball that is able to measure and record motion characteristics of the sports ball when the sports ball is thrown. The sports ball may be able to measure and record the speed, distance, time of flight, height, path, spin rate, curve, release point or other motion characteristics of the thrown ball. All of the above characteristics may be used to help a pitcher optimize different types of pitches.

Referring to the FIGS. 1-5, a sports ball 10 is shown. The sports ball 10 may be constructed to measure and record the speed, distance, time of flight, height, path, spin rate, curve, release point or other motion characteristics of the thrown sports ball 10. The sports ball 10 may be configured to conform to a regulation ball such as a baseball, bowling ball or other regulation sports balls. While embodiments shown in the Figures disclose a baseball, this should not be seen in a limiting manner.

Figure 1:
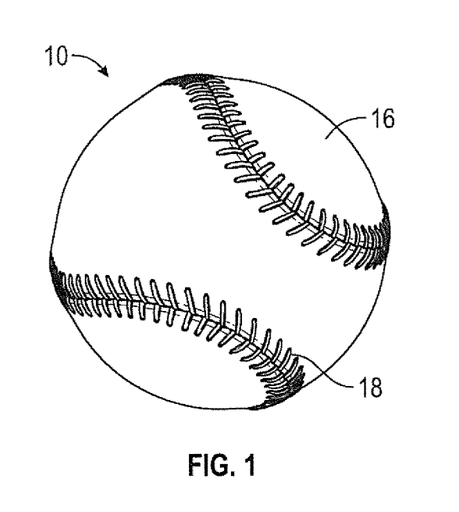
FIG. 1 is a prospective view of a sports ball for measuring a plurality of motion characteristics in accordance with one aspect of the present application.
Figure 2A:
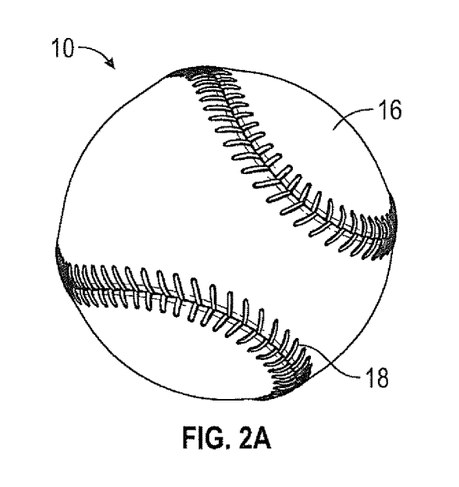
FIG. 2A-2D are prospective view of the different components of the sports ball of FIG. 1 in accordance with one aspect of the present application.
Figure 2B:
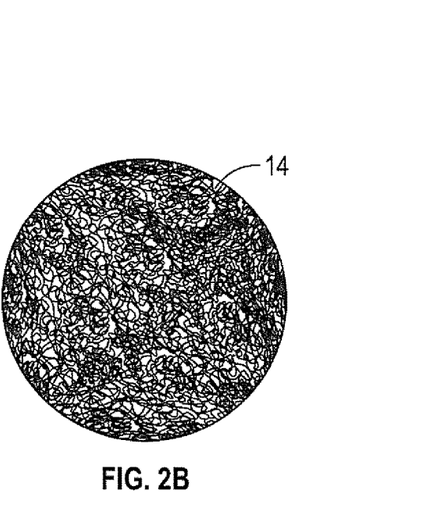
Figure 2C:
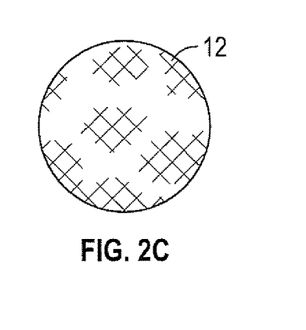
Figure 2D:
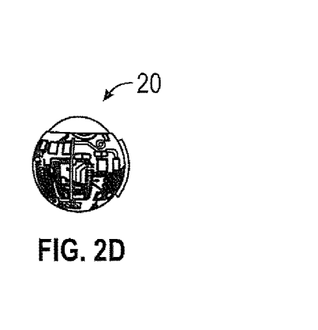
Figure 3:
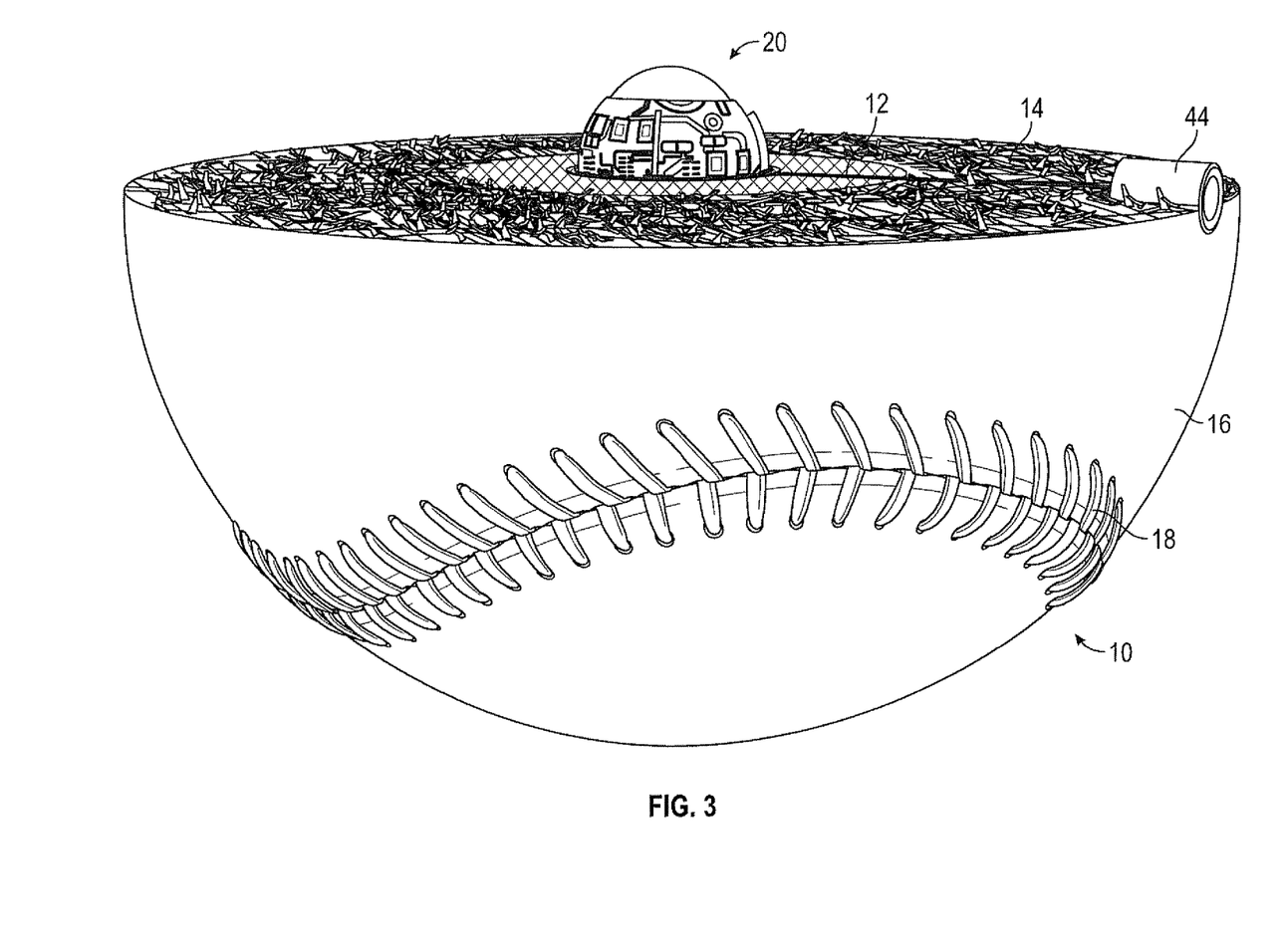
FIG. 3 is a cutaway view of the sports ball of FIG. 1 in accordance with one aspect of the present application.

In the embodiment shown, the sports ball 10 is a regulation baseball. Thus, the sports ball 10 may be configured to be between 9 and 9 ¼ inches in circumference, and 5 to 5 ¼ ounces in weight, and have a coefficient of restitution of no more than 0.578, no less than 0.514.

The sports ball 10 may be constructed in a similar manner to a regulation baseball. The sports ball 10 may have a spherical core 12. The spherical core 12 may be formed of cork, rubber or similar material. A winding 14 may be formed around the spherical core 12. The winding 14 may be formed of wool, poly/cotton or other winding material. A covering 16 may be formed around the winding 14 encompassing the core 12 forming an exterior surface of the sports ball 10. The covering 16 may be formed out of cowhide or similar material. The covering 16 may be formed out of natural or synthetic materials. The covering 16 may be formed in two hourglass shaped halves which may be couple together around the winding 14 encompassing the core 12 by stitching 18.

Figure 4:
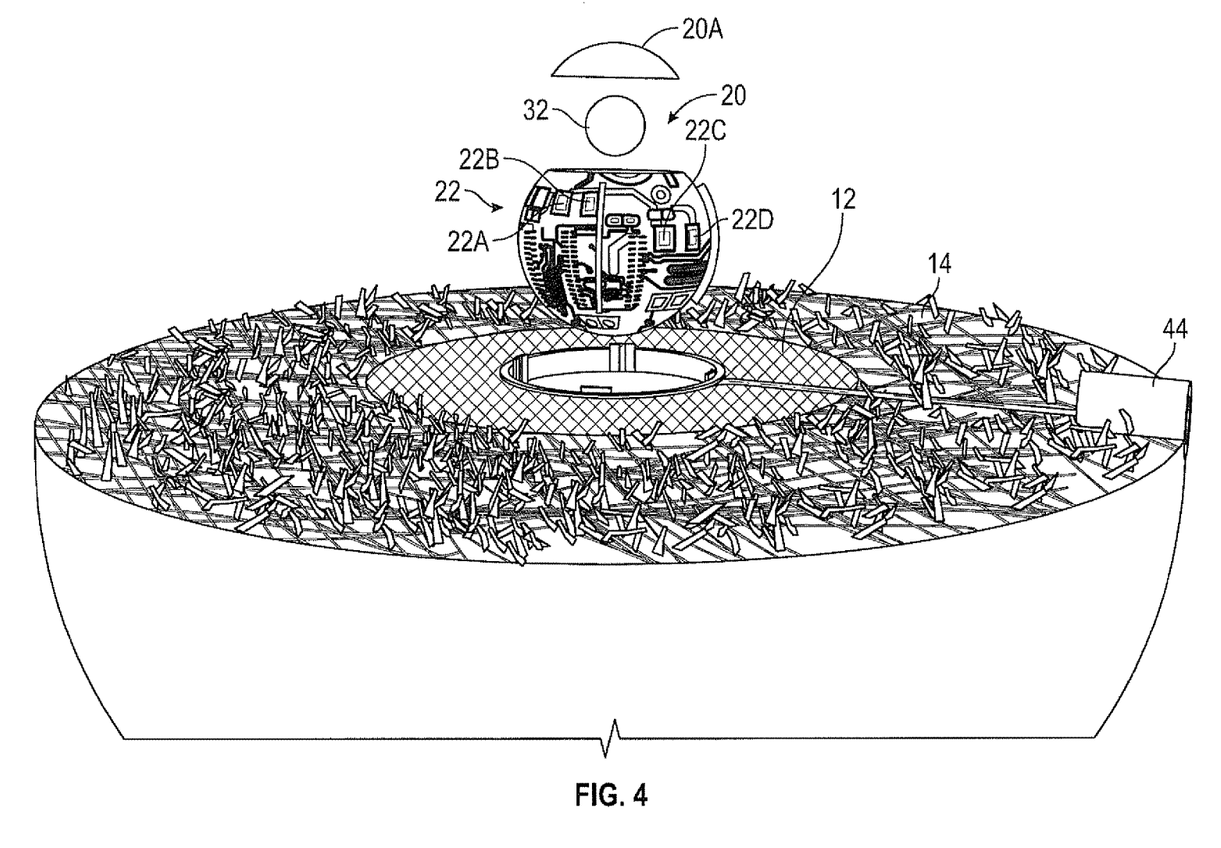
FIG. 4 is a magnified view of the measuring electronics and mounting system of the sports ball of FIG. 1 in accordance with one aspect of the present application.
Figure 5:
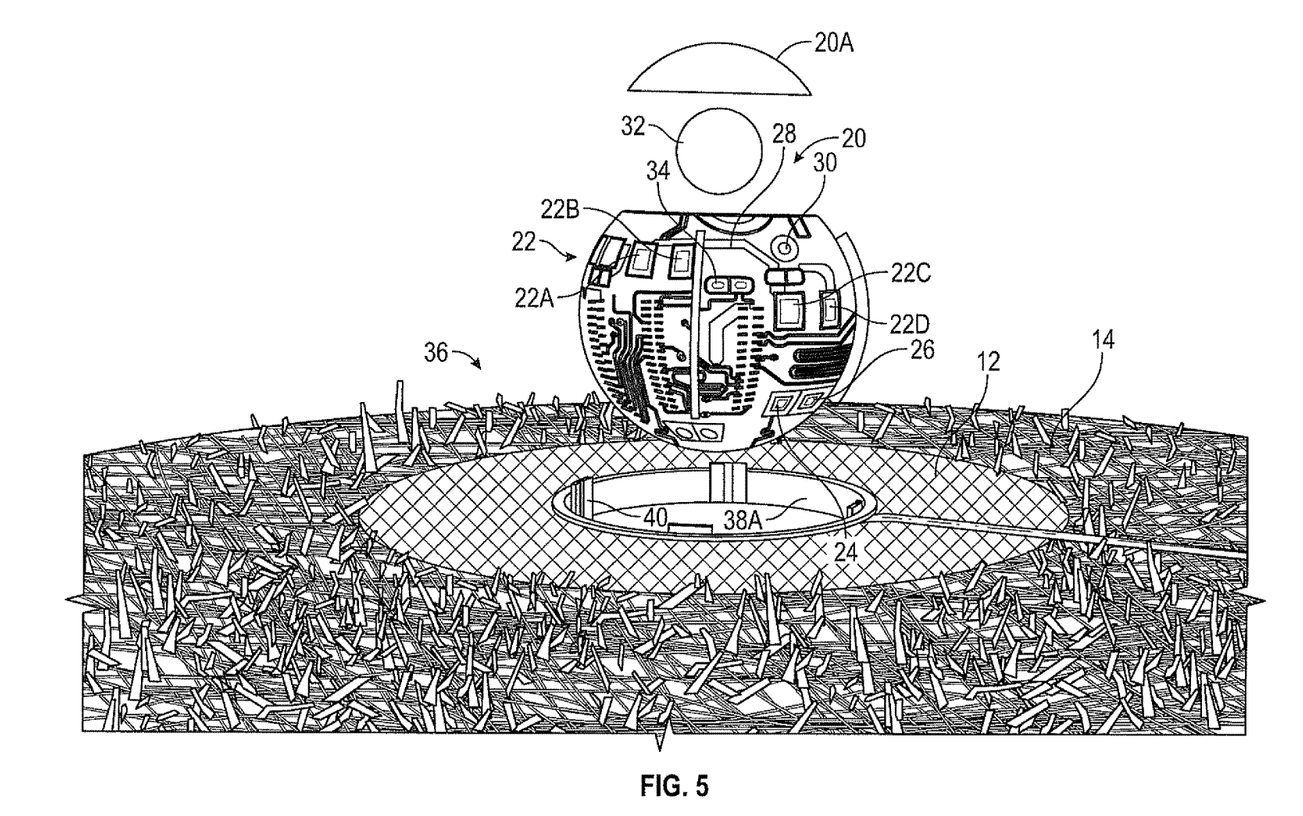
FIG. 5 is another magnified view of the measuring electronics and mounting system of the sports ball of FIG. 1 in accordance with one aspect of the present application.

The sports ball 10 has a spherical circuit board 20. The spherical circuit board 20 may have a hollow interior section. Alternatively, the spherical circuit board 20 may be solid wherein the interior of the spherical circuit board 20 is a non-conductive substrate. A plurality of sensors 22 may be coupled to the spherical circuit board 20. The sensors 22 may be used to monitor different motion characteristics of the thrown sports ball 10. The sensors 22 may include: an accelerometer 22A to measure the speed of the thrown sport ball 10; gyroscope 22B to measure the rotation of the thrown sports ball 10; a position sensor 22C to monitor a location of the thrown sport ball 10; and a pressure sensor 22D to measure barometric pressure as to quantify a change in altitude as the sports ball 10 changes in elevation during delivery and to quantify atmospheric air density in the sports ball 10. The above list is given as an example. Other sensors may be used to measure different motion characteristics without departing from the spirit and scope of the present invention. In accordance with one embodiment, the sports ball 10 may be customized. Thus, a potential buyer of the sports ball 10 may designate which sensors 22 the buyer wishes to incorporate into the sports ball 10.

A processor 24 and memory 26 are coupled to the spherical circuit board 20. The sensors 22 may be coupled to the processor 24 and memory 26 via a plurality of conductive pathways 28. The processor 24 may be used to control the various functions of the sports ball 10. The processor 24 may store a computer program or other programming instructions associated with the memory 26 to control the operation of sports ball 10. The processor 24 may comprise various computing elements, such as integrated circuits, microcontrollers, microprocessors, programmable logic devices, etc, alone or in combination to perform the operations described herein.

The memory 26 may be coupled to the processor 24 as well as other components of the sports ball 10. The memory 26 may be used to store various data monitored by the sensors 22 and utilized by the processor 24 and or other components of the sports ball 10. The memory 26 may include removable and non-removable memory elements such as RAM, ROM, flash, magnetic, optical, and/or other conventional memory elements. The above listing is given as an example and should not be seen in a limiting manner.

The memory 26 may be used to store programming data for instructing the processor 24 or other components of the sports ball 10 to perform certain steps. For example, the processor 24 may obtain the various readings from the plurality of sensors 22. Using the programming data, the processor 24 may calculate a variety of movement characteristics of the sports ball 10. For example, the processor 24 may calculate travel route, distance, time of flight, speed, trajectory height, spin rate, curve of the sports ball 10, release point as well as the barometric change in elevation with the respect in the relative change in movement of the sports ball 10 prior to the release point and to quantify the atmospheric air density due to pitcher's elevation above sea level and other characteristics.

The processor 24 may be coupled to a transmitting device 30. The transmitting device 30 may send all of the data calculated by the processor 24. In accordance with one embodiment, the transmitting device 30 may have an antenna. The antenna of the transmitting device 30 may be incorporated into and form part of the stitching 18. The data may be transmitted over any type of wireless network. For example, the wireless network may be though a 3G cellular communications, such as CDMA, EVDO, GSM/GPRS, or 4G cellular communications, such as WiMAX or LTE or the like. Alternatively, the wireless communication may by using a wireless local area network (WLAN), for example, using Wi-Fi or the like. The above are given as an example and should not be seen in a limiting manner. Other types of wireless networks may be used without departing from the spirit and scope of the present invention. For example, the wireless network may include any wireless communication network associated with a Personal Area Network (PAN), a Local Area Network (LAN), Metropolitan Area Network (MAN), or a Wide Area Network (WAN).

The transmitted data may be sent to a computing device for review. For example, the transmitted data may be sent to a desktop computer, a laptop, a tablet, smartphone, or other computing devices. In accordance with one embodiment, a dongle or similar device may be attached to the computing device. The dongle may be used to aid the computing device in the reception of the transmitted data. The transmitted data may be sent to a server for storage. This may allow a user to review the data at a later time via a computing device. In this embodiment, a user may have to login to a website or via a software application of a mobile computing device to review the transmitted data.

Alternatively, the sports ball 10 may have a data cable 44. In this embodiment, the data monitored by the sensors 22 may be stored in the memory 26. A user may then connect the sports ball 10 to a computing device via the data cable 44 to download the information. The use of the data cable 44.

The components on the spherical circuit board 20 may be powered by a battery 32. The battery 32 may be positioned on the exterior surface of the spherical circuit board 20. Alternatively, the battery 32 may be placed within the interior of the spherical circuit board 20. Placing the battery 32 within the interior of the spherical circuit board 20, may allow the spherical circuit board 20 to be easier to spin balance. In accordance with one embodiment of the present invention, the battery 32 is a spherical battery positioned within the spherical circuit board 20. In this embodiment, a cap 20A may be removed from the spherical circuit board 20. The battery 32 may then be placed within the interior of the spherical circuit board 20. The battery 32 may be a rechargeable battery. The battery 32 may be may charged using wired or wireless technology. By using wireless technology such as by using an electromagnetic field to transfers energy for recharging of the battery 32, the sports ball 10 may become easier to balance.

The spherical circuit board 20, sensors 22 and other associated components are mounted together to be properly balance. Computer programs may be used to mathematically calculate the location of each component on the spherical circuit board 20. If not properly balanced, the spherical circuit board 20 may have one or more counter weights 34. The counter weights 34 may be used to balance the spherical circuit board 20. When the spherical circuit board 20 is constructed, the spherical circuit board 20 may undergo a balance spin test. This may allow one to see if the spherical circuit board 20 is properly balanced. If not, counter weights 34 may be added in predetermined positions to balance the counter weights 34. A balance spin test may show the location and amount of counterweight needed to properly balance the spherical circuit board 20.

A mounting unit 36 may be used to position the spherical circuit board 20 within the core 12. The mounting unit 36 may be used to dynamically balance the spherical circuit board 20 while anchoring the spherical circuit board 20 within the core 12. In accordance with one embodiment, the mounting unit 36 may have a platform 38. The platform 38 may be a cylindrical ring 38A. The spherical circuit board 20 may be positioned within the cylindrical ring 38A. A plurality of mounting brackets 40 may be positioned around a perimeter of the cylindrical ring 38A. The mounting brackets 40 may be structural shaped brackets that are used to hold the spherical circuit board 20 in place and deflect kinematic energy.

To enhance the ability to measure, review and analyze the different motion characteristics of a pitched ball, the person throwing the sports ball 10 may have one or more wearable devices 46. The wearable devices may be placed on the wrist, shoe or other areas of the person. The wearable devices may monitor different movement characteristics of the person throwing the ball. The wearable device may monitor arm slot and movement, stride of the person throwing the sports ball 10 and other movement characteristics of the person throwing the ball. This information may be used in conjunction with the transmitted data from the sports ball 10 to enhance the ability to measure, review and analyze the different motion characteristics of a pitched ball.

Figure 6:
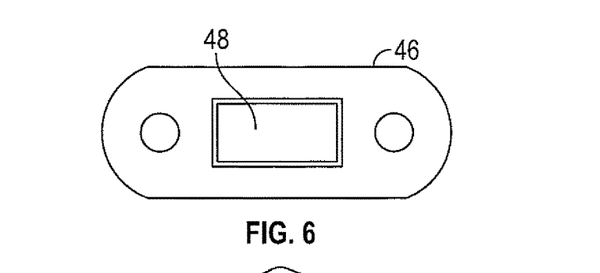
FIG. 6 is a front view of a wearable device used with sports ball of FIG. 1 in accordance with one aspect of the present application.

Referring to FIG. 6, one example of a wearable device 46 is shown. In this embodiment, the wearable device 46 is a foot pod that may be attached to the user's shoe. The foot pod may be used to measure the stride of the person throwing the sports ball 10 and other leg movement characteristics of the person throwing the sports ball 10. FIG. 5 shows just one example. As started above, wearable devices may be placed on the wrist or other areas of the person throwing the sports ball 10.

Figure 7:
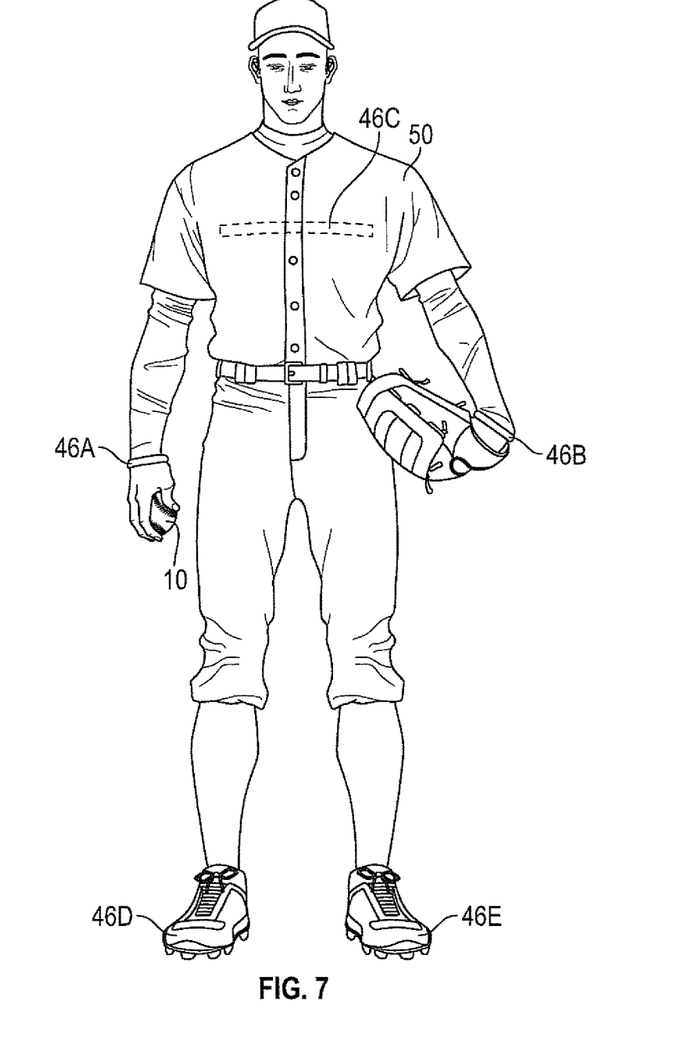
FIG. 7 is a front view of an individual having a plurality of wearable devices used with the sports ball of FIG. 1 in accordance with one aspect of the present application.
Figures 8A, 8B, 8C, 8D, 8E, 8F, 8G:
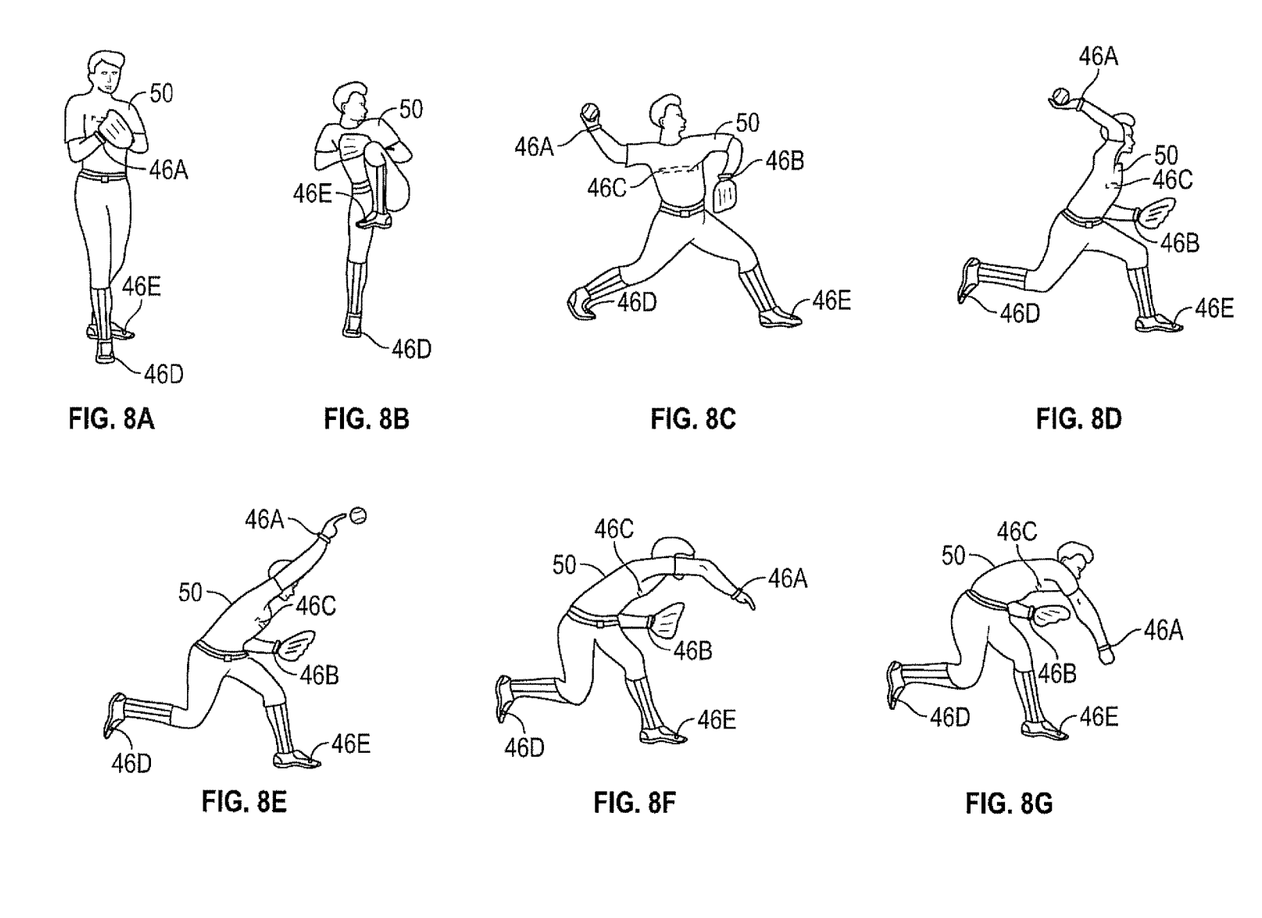
FIG. 8A-8G is a side view of the individual in FIG. 7 having the plurality of wearable device used with the sports ball of FIG. 1 in accordance with one aspect of the present application.

Referring to FIG. 7, an individual 50 is shown having a plurality of wearable devices 46 and the sports ball 10. In this embodiment, the individual 50 may have a wrist wearable device 46A located on a right wrist and another wrist wearable device 46B located on the left wrist. The wrist wearable devices 46A and 46B may be used to measure the movement of the arms of the individual 50 when throwing the sports ball 10. The wrist wearable devices 46A and 46B may be used to measure the grip strength. By monitoring the contraction and release of muscles located around the wrist, the approximate grip strength may be calculated. The above is given as an example and should not be seen in a limiting manner. The wrist wearable devices 46A and 46B may have other sensors that allow the wrist wearable devices 46A and 46B to monitor other characteristics than those mentioned above without departing from the spirit and scope of the present invention.

The wrist wearable devices 46A and 46B may monitor and record the arm movements, grip strength and other characteristics during the pitching process. One can review the recorded information to optimize the pitching performance of the individual 50. For example, the wrist wearable device 46B located on the left wrist may indicate that the position of the left wrist of the individual 50 may be either too close or too far away from the body and may be throwing the individual 50 slightly off balance. Similarly, the wrist wearable device 46A located on the right wrist may indicate that the individual 50 is not following through after the pitch. If the individual 50 is a right-handed pitcher and the wrist wearable device 46A monitors the grip strength, the wrist wearable device 46A may indicate a location of a release point of the pitch. By monitoring the location of the release point, the wrist wearable device 46A may indicate whether the release point of the individual 50 was too early or too late during the delivery.

The data monitored and recorded may be reviewed on a screen 48 (FIG. 5) of the wrist wearable devices 46A and 46B and/or transmitted to a computing device for analysis and review. For example, the transmitted data may be sent to a desktop computer, a laptop, a tablet, smartphone, or other computing devices. In accordance with one embodiment, a dongle or similar device may be attached to the computing device. The dongle may be used to aid the computing device in the reception of the transmitted data. The transmitted data may be sent to a server for storage. This may allow a user to review the data at a later time via a computing device. In this embodiment, a user may have to login to a website or via a software application of a mobile computing device to review the transmitted data.

In accordance with another embodiment, the wrist wearable devices 46A and 46B may have a port for downloading the data. The port may be a USB port or the like which may allow the wrist wearable devices 46A and 46B to be connected to a computer device to download the information recorded and stored.

The plurality of wearable devices 46 may include a chest strap device 46C. The chest strap device 46C may be used to monitor the movement of the chest, breathing patterns, heart rate as well as other characteristics of the individual 50 during the pitching process. One can review the recorded information to optimize the pitching performance of the individual 50. For example, the chest strap device 46C may indicate that the chest is rocking backwards during the wind-up or not in a proper location during the follow through throwing the individual 50 slightly off balance. The chest strap device 46C may indicate that the individual 50 is not breathing properly or that a heat rate of the individual 50 is too elevated and needs to calm down.

The data monitored and recorded may be reviewed on a screen 48 (FIG. 5) of the chest strap device 46C and/or transmitted to a computing device for analysis and review. For example, the transmitted data may be sent to a desktop computer, a laptop, a tablet, smartphone, or other computing devices. In accordance with one embodiment, a dongle or similar device may be attached to the computing device. The dongle may be used to aid the computing device in the reception of the transmitted data. The transmitted data may be sent to a server for storage. This may allow a user to review the data at a later time via a computing device. In this embodiment, a user may have to login to a website or via a software application of a mobile computing device to review the transmitted data.

In accordance with another embodiment, the chest strap device 46C may have a port for downloading the data. The port may be a USB port or the like which may allow the chest strap device 46C to be connected to a computer device to download the information recorded and stored.

The individual 50 may have a foot pod wearable device 46D located on a right shoe and another foot pod wearable device 46E located on the left shoe. The foot pod wearable devices 46D and 46E may be used to measure the movement of the feet of the individual 50 when throwing the sports ball 10 as well as other characteristics.

The foot pod wearable devices 46D and 46E may monitor and record the movement of the foot of the individual 50 as well as other characteristics during the pitching process. One can review the recorded information to optimize the pitching performance of the individual 50. For example, the foot pod wearable devices 46D and 46D may be used to indicate if the individual 50 is dragging the plant foot, not properly planning the plant foot, over striding with the lead foot, not striding wide enough with the lead foot, and the like.

The data monitored and recorded may be reviewed on a screen 48 (FIG. 5) of the foot pod wearable devices 46D and 46D and/or transmitted to a computing device for analysis and review. For example, the transmitted data may be sent to a desktop computer, a laptop, a tablet, smartphone, or other computing devices. In accordance with one embodiment, a dongle or similar device may be attached to the computing device. The dongle may be used to aid the computing device in the reception of the transmitted data. The transmitted data may be sent to a server for storage. This may allow a user to review the data at a later time via a computing device. In this embodiment, a user may have to login to a website or via a software application of a mobile computing device to review the transmitted data.

In accordance with another embodiment, the foot pod wearable devices 46D and 46D may have a port for downloading the data. The port may be a USB port or the like which may allow the chest strap device 46C to be connected to a computer device to download the information recorded and stored.

Referring to FIGS. 8A-8G, the process of throwing the sports ball 10 may be shown with the individual 50 having the wrist wearable devices 46A and 46B, the chest strap device 46C and the foot pod wearable devices 46D and 46D. When throwing the sports ball 10, the wearable devices 46 may monitor the movement as well as other characteristics of the arm, feet, chest and other body parts of the individual 50. As may be seen, the pitching motion is a complex process requiring the proper movement of numerous elements of the body. By monitoring the different body parts, one may optimize the pitching performance of the individual 50.

Figure 9:
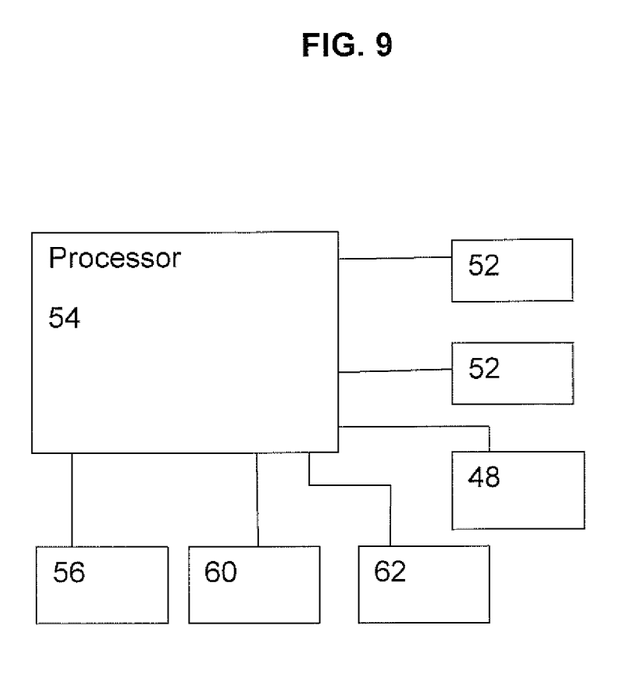
FIG. 9 is a block diagram of the wearable device used with the sports ball of FIG. 1 in accordance with one aspect of the present application.

Referring to FIG. 9, each of the wearable devices 46 may have one or more sensors 52. Each of the sensors 52 may be used to monitor different characteristics of the individual 10 to which the sensor is attached as described above. The sensors 52 may be coupled to a processor 54 and memory 56 via a plurality of conductive pathways. The processor 54 may comprise various computing elements, such as integrated circuits, microcontrollers, microprocessors, programmable logic devices, etc, alone or in combination to perform the operations described herein.

The memory 56 may be coupled to the processor 54 as well as other components of the wearable devices 46. The memory 56 may be used to store various data monitored by the sensors 52 and utilized by the processor 54 and or other components of the wearable devices 46. The memory 56 may include removable and non-removable memory elements such as RAM, ROM, flash, magnetic, optical, and/or other conventional memory elements. The above listing is given as an example and should not be seen in a limiting manner.

The memory 56 may be used to store programming data for instructing the processor 54 or other components of the wearable device 46 to perform certain steps. For example, the processor 54 may obtain the various readings from the plurality of sensors 52. Using the programming data, the processor 54 may calculate and analyze variety of movement characteristics of the individual 50 as well as other measured data.

The processor 54 may be coupled to a transmitting device 60. The transmitting device 60 may send all of the data calculated by the processor 54. In accordance with one embodiment, the transmitting device 60 may have an antenna. The data may be transmitted over any type of wireless network. For example, the wireless network may be though a 3G cellular communications, such as CDMA, EVDO, GSM/GPRS, or 4G cellular communications, such as WiMAX or LTE or the like. Alternatively, the wireless communication may by using a wireless local area network (WLAN), for example, using Wi-Fi or the like. The above are given as an example and should not be seen in a limiting manner. Other types of wireless networks may be used without departing from the spirit and scope of the present invention. For example, the wireless network may include any wireless communication network associated with a Personal Area Network (PAN), a Local Area Network (LAN), Metropolitan Area Network (MAN), or a Wide Area Network (WAN).

The transmitted data may be sent to a computing device for review. For example, the transmitted data may be sent to a desktop computer, a laptop, a tablet, smartphone, or other computing devices. In accordance with one embodiment, a dongle or similar device may be attached to the computing device. The dongle may be used to aid the computing device in the reception of the transmitted data. The transmitted data may be sent to a server for storage. This may allow a user to review the data at a later time via a computing device. In this embodiment, a user may have to login to a website or via a software application of a mobile computing device to review the transmitted data.

Alternatively, the wearable devices 46 may have a data port 62. In this embodiment, the data monitored by the sensors 52 may be stored in the memory 56. A user may then connect the wearable devices 46 to a computing device via the data port 62 to download the information.

The wearable devices 46 may have a screen 48 coupled to the processor 54. The screen 48 may be used to display data analyzed by the processor 54.

The components in the wearable devices 46 may be powered by a battery. The battery may be a rechargeable battery. The battery may be may charged using wired or wireless technology.

The foregoing description is illustrative of particular embodiments of the application, but is not meant to be a limitation upon the practice thereof. The following claims, including all equivalents thereof, are intended to define the scope of the application.

What is claimed is:

1. A sports ball system for calculating movement characteristics comprising:
    a sports ball having components for monitoring and calculating the movement characteristics of the sports ball, the components mounted on a spherical circuit board within the sports ball so the sports ball is balanced, wherein the sports ball comprises:
    a spherical core, the spherical circuit board mounted within the spherical core;
    a mounting unit formed within the spherical core for securing the spherical circuit board within the spherical core, the mounting unit comprising:
        a platform housed within the spherical core; and
        a plurality of mounting brackets positioned around a perimeter of the platform, the mounting brackets used to hold the spherical circuit board in place and deflect kinematic energy;
    winding wrapped around the spherical core; and
    a cover positioned around the winding; and
    a plurality of wearable sensors monitoring body characteristics of an individual throwing the sports ball, wherein each of the plurality of wearable sensors comprises:
        at least one monitoring sensor for monitoring a characteristic of a body the at least one monitoring sensor is positioned upon;
        a processor coupled to the at least one monitoring sensor;
        a memory coupled to the processor; and
        a device for downloading data monitored by the at least one monitoring sensor.

2. The sports ball system in accordance with claim 1, wherein the plurality of wearable sensors comprises at least one wrist sensor.

3. The sports ball system in accordance with claim 1, wherein the plurality of wearable sensors comprises at least one wrist sensor monitoring arm movement and muscle movement.

4. The sports ball system in accordance with claim 1, wherein the plurality of wearable sensors comprises at least one foot sensor.

5. The sports ball system in accordance with claim 1, wherein the plurality of wearable sensors comprises at least one foot sensor monitoring foot movement.

6. The sports ball system in accordance with claim 1, wherein the plurality of wearable sensors comprises at least one chest sensor.

7. The sports system ball in accordance with claim 1, wherein the plurality of wearable sensors comprises at least one chest sensor monitoring at least one of chest movement, breathing patterns and heart rate.

8. The sports ball system in accordance with claim 1, wherein the device is a transmitter coupled to the processor.

9. The sports ball system in accordance with claim 1, wherein the device is a port coupled to the processor.

10. The sports ball system in accordance with claim 1, wherein each of the plurality of wearable sensors comprises a screen coupled to the processor.

11. The sports ball in accordance with claim 1, wherein the sports ball comprises counterweights positioned on the spherical circuit board.

12. A sports ball system for calculating movement characteristics comprising:
    a sports ball comprising:
    a spherical core;
    a spherical circuit board mounted within the spherical core and having components for monitoring and calculating a movement characteristics of the sports ball;
    a mounting unit formed within the spherical core for securing the spherical circuit board within the spherical core, the mounting unit comprising:
        a platform housed within the spherical core; and
        a plurality of mounting brackets positioned around a perimeter of the platform, the mounting brackets used to hold the spherical circuit board in place and deflect kinematic energy;
    winding wrapped around the spherical core; and
    a cover positioned around the winding; and
    a plurality of wearable sensors monitoring body characteristics of an individual throwing the sports ball, wherein the plurality of wearable sensors comprises at least one wrist sensor, at least one foot sensor and a chest sensor.

13. The sports ball system in accordance with claim 12, wherein the at least one wrist sensor monitoring arm movement and muscle movement.

14. The sports ball system in accordance with claim 12, wherein the at least one foot sensor monitoring foot movement.

15. The sports system ball in accordance with claim 12, wherein the chest sensor monitoring at least one of chest movement, breathing patterns and heart rate.

16. The sports ball system in accordance with claim 12, wherein each of the plurality of wearable sensors comprises:
- at least one monitoring sensor for monitoring a characteristic of a body the at least one monitoring sensor is positioned upon;
- a processor coupled to the at least one monitoring sensor;
- a memory coupled to the processor; and
- a device for downloading data monitored by the at least one monitoring sensor.

17. A sports ball system for calculating movement characteristics comprising:
- a sports ball comprising:
- a spherical core;
- a spherical circuit board mounted within the spherical core and having components for monitoring and calculating a movement characteristics of the sports ball;
- a mounting unit formed within the spherical core for securing the spherical circuit board within the spherical core, the mounting unit comprising:
- a platform housed within the spherical core; and
- a plurality of mounting brackets positioned around a perimeter of the platform, the mounting brackets used to hold the spherical circuit board in place and deflect kinematic energy;
- winding wrapped around the spherical core; and
- a cover positioned around the winding; and
- a plurality of wearable sensors monitoring body characteristics of an individual throwing the sports ball, wherein the plurality of wearable sensors comprises at least one wrist sensor, one foot sensor and one chest sensor, the at least one wrist sensor monitoring arm movement and muscle movement, the at least one foot sensor monitoring foot movement and the chest sensor monitoring at least one of chest movement, breathing patterns and heart rate.

18. The sports ball system in accordance with claim 17, wherein each of the plurality of wearable sensors comprises:
- at least one monitoring sensor for monitoring a characteristic of a body the at least one monitoring sensor is positioned upon;
- a processor coupled to the at least one monitoring sensor;
- a memory coupled to the processor; and
- a device for downloading data monitored by the at least one monitoring sensor.

* * * * *